3,074,907
PRESERVATION OF RUBBER WITH ALKOXY-PHENYL ALICYCLIC AMINES

David J. Beaver, Richmond Heights, and Paul J. Stoffel, St. Louis, Mo., assignors to Monsanto Chemical Company, St. Louis, Mo., a corporation of Delaware
No Drawing. Filed Mar. 25, 1958, Ser. No. 723,672
9 Claims. (Cl. 260—45.9)

The present invention relates to a method of preserving diene hydrocarbon rubbers and to the rubber compositions so obtained.

Deterioration of rubber due to aging is a well defined problem. The degradation is manifested in the case of natural rubber by loss of tensile strength and it is usually attributed to absorption of oxygen. It has long been known that such deterioration can be greatly retarded by treating the rubber with substances known as age resisters or antioxidants.

Degradation of the vulcanizate due to ozone while under static or dynamic stress is a serious problem, particularly with respect to the service life of rubber tires, and is aggravated by the fact that in general age resisters or antioxidants have little or no value in protecting vulcanizates against deterioration by ozone.

The flexing of rubber, such as that which takes place in the side walls of a tire, causes the formation of cracks in the rubber. These cracks may ultimately cause failure of the tire side wall. The tendency toward crack formation has been particularly pronounced in white side wall tires. Compounding ingredients useful for reducing the formation of cracks on flexing are known as antiflex cracking agents. However, some good antiflex-cracking agents are not suitable for use in white side walls because of their tendency to discolor.

It is also well known that in emulsion processes for producing rubbery material by polymerizing a diolefin, such as butadiene, with styrene, it is desirable to add an antioxidant or stabilizer to the polymerizate to prevent oxidation and other undesirable changes of the rubbery material during storage.

An object of this invention is to provide agents which can be incorporated into the diene hydrocarbon rubbers to protect them against one or more of the adverse effects of the conditions to which they may be exposed. Another object is to provide stabilized rubber compositions whether in the vulcanized or unvulcanized condition. A further object is to provide a method of preserving a rubber.

Toward these and other objects there is incorporated into the diene hydrocarbon rubber, preferably prior to vulcanizing, a minor amount of a compound of the structure

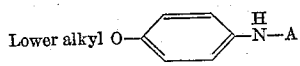

where A represents an alicyclic radical, preferably cyclohexyl or cyclopentyl but alkyl substituted derivatives thereof are suitable. The lower alkyl group is preferably ethyl but may be methyl, isopropyl, propyl, a butyl or an amyl radical.

The N-alicyclic-p-alkoxyanilines of this invention are obtained by condensing the corresponding alkoxyaniline with an alicyclic ketone while removing water from the reaction mixture by azeotropic distillation and then subjecting the condensate to the action of molecular hydrogen in the presence of a hydrogenation catalyst. Their preparation is illustrated by the following procedure:

Into a suitable reactor fitted with a thermometer, stirrer, water trap, condenser and outlet to vacuum pump were charged 91.5 grams (0.667 mole) of p-phenetidine and 262.0 grams (2.67 moles) of cyclohexanone. The mixture was heated to 90° C. and the pressure of the system reduced to induce refluxing at this temperature. The reaction was continued until the theoretical quantity of water had been collected in the trap. The excess cyclohexanone was then distilled from the mixture under reduced pressure to a pot temperature of 140° C. at 20 mm. Hg and the reactor cooled to 80° C. To the crude anil, weighing about 142.3 grams, was added 145 grams of isopropanol and the solution charged to an autoclave along with 11.6 grams of Raney nickel (~50% water) which had been washed four times with isopropanol. The autoclave was then purged several times with hydrogen at 100 lbs./in.², brought up to 440 lbs./in.² hydrogen pressure, agitation started and heat applied. Absorption of hydrogen started at about 84° C. but the major portion of reaction occurred at 98–108° C. After absorption of hydrogen had ceased, the autoclave was cooled to 80° C. and the contents filtered to remove catalyst. The isopropanol was removed by reduced pressure distillation to a pot temperature of 125° C. at 20 mm. Hg. The N-cyclohexyl-p-phenetidine was obtained in 94.8% yield, M. P. 48–53° C.

The following tests illustrate the value of the compounds of this invention as protective agents.

To demonstrate the protection afforded to natural rubber in a white stock and resistance to discoloration, the following base stock was compounded:

| | Parts by weight |
|---|---|
| Pale crepe rubber | 100.0 |
| Zinc oxide | 25.0 |
| Titanium oxide | 50.0 |
| Clay | 15.0 |
| Sulfur | 3.0 |
| Stearic acid | 1.0 |
| 2,2'-dithiobis benzothiazole | 0.6 |
| Diphenylguanidine | 0.15 |

To the base stock 1.5 parts of antidegradant were added. The stocks were vulcanized in the usual manner by heating in a press at 144° C. for 30 and 45 minutes. The first column of data in Table I shows the percent retention of ultimate tensile strength after aging for 9 hours in an air bomb at 121° C. under 80 lbs. air pressure per square inch. The figures are for the optimum cures. The second and third columns show the resistance to flex cracking before and after aging 96 hours at 100° C. in an oven. The figures recorded are kilocycles to failure on a Firestone flexing machine.

Table II records the resistance to discoloration. Samples of the vulcanizates were exposed to ultraviolet light irradiation from an S–1 sunlamp for ten days in the open air of a room. The color of the specimens after exposure was evaluated by means of a photovolt reflectance meter calibrated against standard magnesium oxide as 100% reflectance. The percentages of incident light reflected from the surfaces of the samples after exposure are recorded in the first column. In the second column are recorded the light reflected after exposing the samples 72 hours in a Fadeometer. In this instrument a carbon arc supplies the light. It will be noted that an alkyl p-phenetidine discolors the stock much more than alicyclic p-phenetidines. N-phenyl-p-phenetidine discolored the stock even more.

*Table I*

| Antidegradant | Percent Original Tensile Retained | Firestone Kilocycles Unaged | Flexing to Failure Aged |
|---|---|---|---|
| None | 13.0 | 78 | 28 |
| N-Cyclopentyl-p-phenetidine | 48.0 | 202 | 91 |
| N-Cyclohexyl-p-phenetidine | 53.1 | 185 | 102 |
| N-Cyclohexyl-p-anisidine | 55.0 | 182 | 72 |
| N-2-Methylcyclohexyl-p-phenetidine | 42.0 | 151 | 99 |

*Table II*

| Antidegradant | Percent Reflectivity After 10 days' Exposure in Open Room | Percent Reflectivity After 72 Hrs. in a Fadeometer |
|---|---|---|
| N-Cyclopentyl-p-phenetidine | 57 | 61 |
| N-Cyclohexyl-p-phenetidine | 60 | 67 |
| N-Cyclohexyl-p-anisidine | 57 | 61 |
| N-2-Methylcyclohexyl-p-phenetidine | 60 | 67 |
| n-Butyl-p-phenetidine | 50 | 48 |

To demonstrate the anti-exposure cracking properties of the preferred compounds portions of the 45 minute cures were exposed to ozone and the surface condition after exposure recorded. Since evaluation under static conditions is not indicative of the service obtained with many types of rubber articles which must withstand flexing, the vulcanized compositions were evaluated under dynamic conditions in an atmosphere containing a definite concentration of ozone. The test is carried out in the following manner: Samples of the stocks are cured in the form of a belt ½" wide, ¼" thick and 5 5/16" diameter and mounted on 1" diameter shafts. The ozone concentration is maintained at 20–30 parts per hundred million throughout the test and the shafts are rotated at 75 r.p.m. In this manner a momentary elongation through a range of 0–20% is provided at any portion of the test specimen passing over the shaft. (The apparatus and procedure employed is described in a paper of Creed et al., published in Analytical Chemistry, vol. 25, page 241, February 1953.) The experimental test specimens are compared visually at various intervals noting the extent of cracking. A stock which is severely cracked has no service life remaining in terms of the useful life of a rubber article and where the cracking is designated as extremely severe the degradation is well beyond even this point. The results with a typical antidegradant are set forth below:

*Table III*

| Antidegradant | Surface Cracking after Exposure to Ozone | | | | |
|---|---|---|---|---|---|
| | 12 Hrs. | 24 Hrs. | 36 Hrs. | 48 Hrs. | 60 Hrs. |
| None | slight | moderate | severe | very severe. | very severe. |
| N-Cyclohexyl-p-phenetidine. | none | none | none | very slight. | very slight. |

Comparable results were obtained with N-cyclopentyl-p-phenetidine and N-cyclohexyl-p-anisidine.

As illustrative of the control of exposure cracking of vulcanized sulfur-vulcanizable synthetic rubber-like materials, a base stock of butadiene-1,3-styrene copolymer rubber was prepared as follows:

| | Parts by weight |
|---|---|
| Butadiene-styrene copolymer rubber [1] | 100.0 |
| Carbon black | 50.0 |
| Zinc oxide | 4.0 |
| Stearic acid | 2.0 |
| Saturated hydrocarbon softener | 10.0 |
| Sulfur | 1.75 |
| N-tert. butyl-2-benzothiazolesulfenamide | 1.2 |

[1] SB–R–1500.

The ingredients were admixed on a rubber mill in the usual manner, 1.5 parts of N-cyclohexyl-p-phenetidine added and the respective stocks cured in a press at 144° C. for 30 minutes. The vulcanizates were then evaluated for cracking resistance as aforedescribed. The results of the tests are set forth below:

*Table IV*

| Antidegradant | 12 Hrs. | 24 Hrs. | 36 Hrs. | 48 Hrs. | 60 Hrs. |
|---|---|---|---|---|---|
| None | very slight. | slight | moderate | severe | severe. |
| N-Cyclohexyl-p-phenetidine. | none | none | very slight. | very slight. | very slight. |

The antidegradants are also very effective in natural rubber black stocks. They are comparable to commercial amine antidegradants. As further demonstrative of their valuable properties the new antidegradants were incorporated into a natural rubber stock comprising:

| | Parts by weight |
|---|---|
| Smoked sheets | 100.0 |
| Carbon black | 50.0 |
| Zinc oxide | 5.0 |
| Stearic acid | 3.0 |
| Saturated hydrocarbon softener | 3.0 |
| Sulfur | 2.5 |
| N-tert. butyl 2-benzothiazolesulfenamide | 0.5 |
| Antidegradant | 1.5 |

The stocks were cured by heating 45 minutes in a press at 144° C. The vulcanizates were exposed to ozone under dynamic conditions in the manner described above. Below are recorded the hours exposure to ozone at a concentration of 25±5 parts per hundred million before surface cracking was observed. Other data are the percent of the original tensile strength retained after aging in a circulating air oven 48 and 72 hours. The last column records flex cracking resistance observed on the samples aged 48 hours. Results for a typical commercial amine antioxidant are included in the table.

*Table V*

| Antidegradant | Hours to Initial Crack in Ozone | Percent Tensile Retention After Aging in Air at 100° C. for— | | Firestone Flexing Kilocycles to Failure After Aging 48 Hrs/100° C. |
|---|---|---|---|---|
| | | 48 Hrs. | 72 Hrs. | |
| N-cyclopentyl-p-phenetidine | 84 | 75 | 67 | 173 |
| N-cyclohexyl-p-phenetidine | 84 | 72 | 64 | 120 |
| N-2-methylcyclohexyl-p-phenetidine | 60 | 69 | 58 | 146 |
| N-cyclohexyl-p-anisidine | 84 | 76 | 64 | 124 |
| Phenyl beta-naphthylamine | 60 | 52 | 42 | 108 |
| None | 12 | 32 | 19 | 29 |

Another embodiment of the invention resides in the stabilization of butadiene-styrene copolymer rubber. This feature of the invention was demonstrated by adding the stabilizer to an unstabilized butadiene-stydene copolymer latex (SB–R–1500 latex containing 23.5% bound styrene, no stabilizer, 19.9% solids) in the uncured state. The stabilizer was added in amounts of 0.25 part, 0.5 part and 1.0 part on the dry rubber content. Phenyl beta-naphthylamine, commonly employed as a stabilizer, was used as a control. The dispersions containing the stabilizer were coagulated by adding 26% NaCl solution followed by 5% sulfuric acid and the coagulum washed and dried. The samples were then aged in a circulating air oven at 100° C. for 72 hours. Hardness was determined before and after aging by a Shore durometer and the viscosity of specimens determined by a Mooney plastometer. The instrument is described by Melvin Mooney, Industrial & Engineering Chemistry, Analytical Edition, March 15, 1934, pages 147–151, and the test procedure follows A.S.T.M. Method D–927. The results follow:

*Table VI*

| Material Added to Copolymer | Amt., percent | Mooney Viscosity | | Hardness | |
|---|---|---|---|---|---|
| | | Unaged | Aged 72 Hrs. | Unaged | Aged 72 Hrs. |
| None | | 42 | 104 | 35 | 56 |
| N-Cyclohexyl-p-phenetidine | 0.25 | 48 | 41 | 35 | 40 |
| Do | 0.5 | 45 | 46 | 36 | 39 |
| Do | 1.0 | 44 | 48 | 36 | 40 |
| Phenyl beta-naphthylamine | 0.25 | 47 | 44 | 37 | 40 |
| Do | 0.5 | 47 | 46 | 36 | 40 |
| Do | 1.0 | 42 | 44 | 37 | 39 |

It is obvious from the foregoing that the alicyclic radical is critical for the desirable combination of properties described. Replacement of alicyclic by aryl or alkyl results in loss of the non-staining character. The alicyclic stabilizers of this invention are effective for diene hydrocarbon rubbers. They are substantially non-discoloring and may be used to advantage in any rubber composition, wherether of natural rubber or of a synthetic rubber-like polymer or copolymer. They may be used to advantage in a rubber-like copolymer in the uncured state to prevent loss of properties during storage.

Smaller amounts of the stabilizers may be employed than those indicated in the examples. Amounts as small as 0.1% by weight on the rubber as well as amounts higher than those specifically shown, as for example up to 5% by weight on the rubber, may be employed depending upon the nature of the rubber, the other compounding ingredients used and the objectives of the compounder.

It is intended to cover all changes and modifications of the examples of the invention herein chosen for purposes of disclosure which do not constitute departures from the spirit and scope of the invention.

What is claimed is:

1. The method of preserving a butadiene-styrene copolymer rubber which comprises incorporating therein a small amount, within the range of 0.1%–5% of the rubber hydrocarbon sufficient to inhibit degradation, by ozone of a compound of the structure

where A represents an alicyclic radical containing at least 5 but not more than 6 carbon atoms and R represents lower alkyl of 1 to 5 carbon atoms inclusive.

2. The method of preserving a sulfur vulcanizable diene hydrocarbon rubber normally subject to degradation by ozone which comprises incorporating therein a small amount, within the range of 0.1%–5% of the rubber hydrocarbon sufficient to inhibit degradation by ozone of N-cyclohexyl-p-phenetidine.

3. The method of preserving a sulfur vulcanizable diene hydrocarbon rubber normally subject to degradation by ozone which comprises incorporating therein a small amount, within the range of 0.1%–5% of the rubber hydrocarbon sufficient to inhibit degradation, by ozone of N-cyclopentyl-p-phenetidine.

4. Sulfur vulcanized butadiene-styrene copolymer rubber having incorporated therein a small amount, within the range of 0.1%–5% of the rubber hydrocarbon sufficient to inhibit degradation, by ozone of a compound of the structure

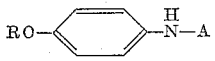

where A represents an alicyclic radical containing at least 5 but not more than 6 carbon atoms and R represents lower alkyl of 1 to 5 carbon atoms inclusive.

5. Sulfur vulcanized diene hydrocarbon rubber normally subject to degradation by ozone having incorporated therein a small amount, within the range of 0.1%–5% of the rubber hydrocarbon sufficient to inhibit degradation, by ozone of a compound of the structure

where A represents a methyl substituted cyclohexyl radical and R represents lower alkyl of 1 to 5 carbon atoms inclusive.

6. Sulfur vulcanized diene hydrocarbon rubber normally subject to degradation by ozone having incorporated therein a small amount, within the range of 0.1%–5% of the rubber hydrocarbon sufficient to inhibit degradation, by ozone of N-cyclohexyl-p-phenetidine.

7. Sulfur vulcanized diene hydrocarbon rubber normally subject to degradation by ozone having incorporated therein a small amount, within the range of 0.1%–5% of the rubber hydrocarbon sufficient to inhibit degradation, by ozone of N-cyclohexyl-p-anisidine.

8. Butadiene-styrene copolymer rubber having incorporated therein a small amount, within the range of 0.1%–5% of the rubber hydrocarbon sufficient to inhibit degradation, by ozone of a compound of the structure

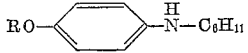

where R represents lower alkyyl of 1 to 5 carbon atoms inclusive.

9. Butadiene-styrene copolymer rubber having incorporated therein a small amount, within the range of 0.1%–5% of the rubber hydrocarbon sufficient to inhibit degradation, by ozone of N-cyclohexyl-p-phenetidine.

References Cited in the file of this patent

UNITED STATES PATENTS 2,829,121    Leeper                 Apr. 1, 1958